US010042652B2

(12) United States Patent
Jacoby et al.

(10) Patent No.: US 10,042,652 B2
(45) Date of Patent: Aug. 7, 2018

(54) HOME AUTOMATION SYSTEM

(71) Applicant: Google Inc., Mountain View, CA (US)

(72) Inventors: Mackenzie Lee Jacoby, Palo Alto, CA (US); Robert Toscano, San Francisco, CA (US); Mark Spates, IV, San Francisco, CA (US); David Matthew Anthony Putzolu, Hillsboro, OR (US)

(73) Assignee: Google LLC, Mountain View, CA (US)

( * ) Notice: Subject to any disclaimer, the term of this patent is extended or adjusted under 35 U.S.C. 154(b) by 148 days.

(21) Appl. No.: 15/234,499

(22) Filed: Aug. 11, 2016

(65) Prior Publication Data
US 2018/0046465 A1 Feb. 15, 2018

(51) Int. Cl.
*G06F 1/24* (2006.01)
*G06F 9/445* (2018.01)
*H04L 29/06* (2006.01)
*H04L 12/28* (2006.01)
*G06F 9/4401* (2018.01)

(52) U.S. Cl.
CPC .......... *G06F 9/445* (2013.01); *H04L 12/2816* (2013.01); *H04L 12/2818* (2013.01); *H04L 63/101* (2013.01); *H04L 63/102* (2013.01); *G06F 9/4411* (2013.01)

(58) Field of Classification Search
CPC ........ G06F 9/44; H04L 63/101; H04L 63/102
USPC ....................................................... 713/100
See application file for complete search history.

(56) References Cited

U.S. PATENT DOCUMENTS

| 8,411,562 B2 * | 4/2013 | Chia ...................... H04L 63/04 370/230 |
| 8,780,201 B1 | 7/2014 | Scalisi et al. |
| 8,823,795 B1 | 9/2014 | Scalisi et al. |

(Continued)

FOREIGN PATENT DOCUMENTS

| WO | WO-2014072910 A1 | 5/2014 |
| WO | WO-2016034939 A1 | 3/2016 |

OTHER PUBLICATIONS

International Search Report and Written Opinion for Application No. PCT/US2017/044294 dated Sep. 25, 2017.

*Primary Examiner* — Jaweed A Abbaszadeh
*Assistant Examiner* — Volvick Derose
(74) *Attorney, Agent, or Firm* — Honigman Miller Schwartz and Cohn LLP

(57) ABSTRACT

A method for operating a home automation system includes receiving a device modification request from a requesting user device of a requesting user to modify a configurable device property of a requested household device. The requesting user is one of one or more users associated with the household. The method further includes identifying the requested household device based on a home structure mapping the household devices to the corresponding device rooms based on a corresponding location of each household device in the residence. The method also includes determining whether the requesting user has an assigned access level granting access to the requested household device and allowing modification of the one or more configurable device properties of the requested household device. When the requesting user has been assigned an access level, the method includes permitting the modification of the at least one configurable device property of the requested household device.

19 Claims, 12 Drawing Sheets

(56) References Cited

U.S. PATENT DOCUMENTS

| | | | |
|---|---|---|---|
| 8,825,020 B2 | 9/2014 | Mozer et al. | |
| 8,842,180 B1 | 9/2014 | Kasmir et al. | |
| 8,872,915 B1 | 10/2014 | Scalisi et al. | |
| 9,058,738 B1 | 6/2015 | Scalisi | |
| 9,060,104 B2 | 6/2015 | Scalisi | |
| 9,065,987 B2 | 6/2015 | Kasmir et al. | |
| 9,094,409 B2 | 7/2015 | Zhang et al. | |
| 9,094,584 B2 | 7/2015 | Scalisi et al. | |
| 9,113,051 B1 | 8/2015 | Scalisi | |
| 9,237,318 B2 | 1/2016 | Kasmir et al. | |
| 9,247,219 B2 | 1/2016 | Kasmir et al. | |
| 9,825,958 B2 * | 11/2017 | Lewis | H04L 63/101 |
| 2002/0184351 A1 * | 12/2002 | Istvan | H04L 12/66 709/222 |
| 2003/0121032 A1 | 6/2003 | Cho et al. | |
| 2004/0148632 A1 * | 7/2004 | Park | H04N 5/44582 725/81 |
| 2011/0252071 A1 * | 10/2011 | Cidon | G06F 17/30174 707/802 |
| 2012/0182939 A1 * | 7/2012 | Rajan | A61B 5/0008 370/328 |
| 2015/0116811 A1 * | 4/2015 | Shrivastava | G08C 17/02 359/275 |
| 2016/0073264 A1 * | 3/2016 | Van den Broeck | H04W 4/021 455/411 |
| 2016/0335423 A1 * | 11/2016 | Beals | H04L 12/2825 |
| 2017/0126689 A1 * | 5/2017 | Lloyd | H04L 63/102 |
| 2017/0142124 A1 * | 5/2017 | Mukhin | H04L 63/105 |

* cited by examiner

HOME AUTOMATION SYSTEM

TECHNICAL FIELD

This disclosure relates to home automation systems and home networked devices.

BACKGROUND

Internet-connected devices in households facilitate interaction with updated content and allow users to access devices from outside a home. In recent years, the internet of things (IOT) has grown to include an array of smart devices that include wirelessly Internet-connected thermostats, refrigerators, televisions, lights, plumbing, etc. With an increasing number of smart devices present in households, management and access to the smart devices is important to realize their connected potential. Currently, a smart device may have an owner or administrator that controls the functions of the smart device. While other users may want to access device settings, their access may be limited without full ownership privileges. Additionally, owners of smart devices typically may not want to provide other users with full administrative rights. The step of exchanging an administrator username and password may compromise security, as well as place an additional burden to users of the smart devices.

SUMMARY

One aspect of the disclosure provides a method for operating a home automation system. The method includes receiving, at data processing hardware, a device modification request from a requesting user device of a requesting user to modify at least one configurable device property of a requested household device of a household. The requesting user is one of one or more users associated with the household. The household is associated with a residence having one or more device rooms. Each device room has at least one household device in communication with a communication network of the residence. Each household device has one or more configurable device properties. Each user is associated with a corresponding user device configured to communicate with the communication network of the residence. The method further includes identifying, by the data processing hardware, the requested household device based on a home structure mapping the one or more household devices to the corresponding one or more device rooms based on a corresponding location of each household device in the residence. The method also includes determining, by the data processing hardware, whether the requesting user has an assigned access level granting access to the requested household device and allowing modification of the one or more configurable device properties of the requested household device. When the requesting user has been assigned the access level granting access to the requested household device and allowing modification of the one or more configurable device properties of the requested household device, the method includes permitting, by the data processing hardware, the modification of the at least one configurable device property of the requested household device.

Implementations of the disclosure may include one or more of the following optional features. In some implementations, the method includes transmitting a connection authorization command from the data processing hardware to the requested household device. The connection authorization command may permit the requesting user device of the requesting user to connect to the requested household device through the communication network and modify the at least one configurable device property of the requested household device. The method also includes transmitting a device command from the data processing hardware to the requested household device to modify the at least one configurable device property. In some examples, the device modification request includes at least one of gesture command or a voice command, e.g., processed at a requesting user device. The device command may be based on at least one of the gesture command or the voice command.

In some implementations, the method includes, for each user, assigning by the data processing hardware, a corresponding access level for each household device. The access level identifies whether the user can access, by the corresponding user device, the household device though the communication network, and whether the user can modify, by the corresponding user device, at least one configurable device property of the household device. The method also includes receiving, at the data processing hardware, a user group for the requested household device. The user group may indicates at least one user permitted to access the requested household device and the corresponding access level of the at least one user. When the user group for the requested household device includes the requesting user, the method may include allowing modification of the at least one configurable device property of the requested household device.

In some examples, the method includes assigning at least one user of the one or more users associated with the household as an administrator that determines the user group. The method may include assigning two or more of the household devices different administrators and assigning each administrator access to all of the configurable device properties of the corresponding household device. Each administrator may be one of the one or more users. The method may also include transmitting a command from the user device to the requested household device to modify the at least one configurable device property. In some examples, the method includes displaying, on a screen in communication with the data processing hardware, the one or more users associated with the household. The method may further include accessing a software application to control the household device by communicating with the screen.

Another aspect of the disclosure provides a system for operating a home automation system. The system includes data processing hardware and memory hardware in communication with the data processing hardware. The memory hardware stores instructions that when executed on the data processing hardware cause the data processing hardware to perform operations. The operations include receiving a device modification request from a requesting user device of a requesting user to modify at least one configurable device property of a requested household device of a household. The requesting user is one of one or more users associated with the household. The household is associated with a residence having one or more device rooms. Each device room has at least one household device in communication with a communication network of the residence. Each household device has one or more configurable device properties. Each user is associated with a corresponding user device configured to communicate with the communication network of the residence. The operations also include identifying the requested household device based on a home structure mapping the one or more household devices to the corresponding one or more device rooms based on a corresponding location of each household device in the residence.

The operations further include determining whether the requesting user has an assigned access level granting access to the requested household device and allowing modification of the one or more configurable device properties of the requested household device. When the requesting user has been assigned the access level granting access to the requested household device and allowing modification of the one or more configurable device properties of the requested household device, the operations include permitting the modification of the at least one configurable device property of the requested household device.

Implementations of the disclosure may include one or more of the following optional features. In some implementations, the operations include transmitting a connection authorization command from the data processing hardware to the requested household device. The connection authorization command may permit the requesting user device of the requesting user to connect to the requested household device through the communication network and modify the at least one configurable device property of the requested household device. The operations further include transmitting a command from the data processing hardware to the requested household device to modify the at least one configurable device property. In some examples, the operations include receiving a gesture command or a voice command from the requesting user device. The gesture command or the voice command may include the device modification request.

In some implementations, the operations include, for each user, assigning a corresponding access level for each household device. The access level may identify whether the user can access, by the corresponding user device, the household device though the communication network, and whether the user can modify, by the corresponding user device, at least one configurable device property of the household device. In some examples, the operations include receiving a user group for the requested household device. The user group may indicate at least one user permitted to access the requested household device and the corresponding access level of the at least one user. When the user group for the requested household device includes the requesting user, the operations may include allowing the modification of the at least one configurable device property of the requested household device.

At least one user of the one or more users may be associated with the household administrator that determines the user group. Two or more of the household devices may have different administrators. Each administrator may have access to all of the one or more configurable device properties of the corresponding household device. Each administrator may be one of the one or more users. At least one user may be associated with multiple households. In some examples, the operations include displaying on a screen in communication with the data processing hardware the one or more user associated with the household.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A residence may have many internet-connected household devices connected to a network of the residence. These household devices may include, but are not limited to refrigerators, televisions, computers and lights. Each household device may have an owner or administrator with full access to control the device. The owner may provide access to the device so that other household members can use selected features of the device, while not giving the other household members full administrative privileges. Accordingly, the owner may want to limit the level of device access to household members. This application details systems and methods to share access on a device level between a device owner and household members, while retaining control at an administrative level for the device owner.

System Overview

Figure 1:
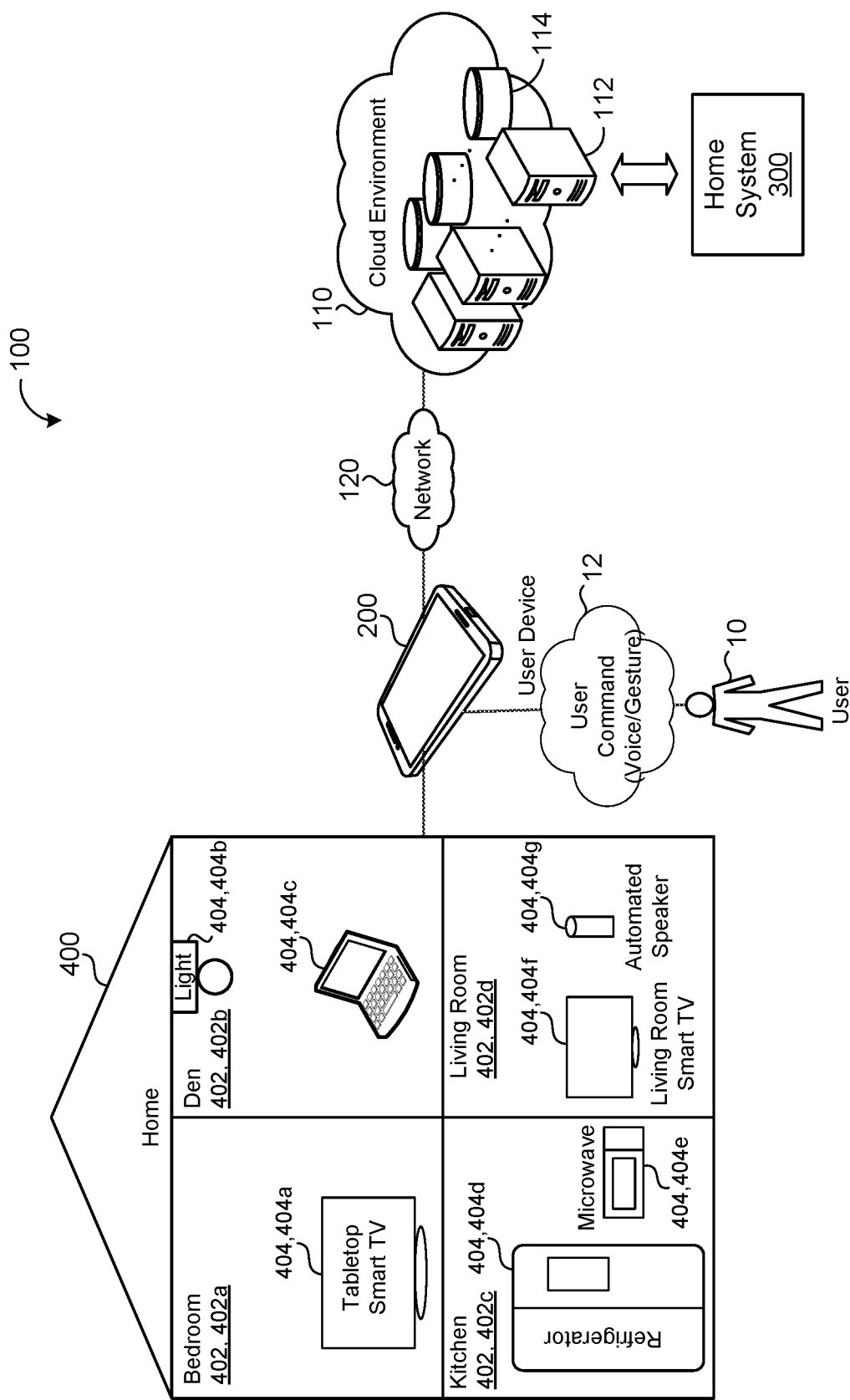
FIG. 1 is a schematic view of an example home system in communication with a home.

FIG. 1 illustrates an example system 100 that includes a user device 200 associated with a user 10 in communication with a remote system 110 via a network 120. The remote system 110 may be a distributed system (e.g., cloud environment) having scalable/elastic computing resources 112 and/or storage resources 114. The user device 200 and/or the remote system 110 execute a home system 300 and optionally receive data from one or more data sources. The network 120 may include various types of networks, such as a local area network (LAN), wide area network (WAN), and/or the Internet.

A home 400 may include device rooms 402 with household devices 404 that are in wired or wireless communication with the user device 200 and the remote system 110 through the network 120. For example, the home 400 may have a bedroom 402, 402*a*, a den 402, 402*b*, a kitchen 402, 402*c*, and a living room 402, 402*d*. The bedroom 402, 402*a* may include a tabletop smart television 404*a*. The den 402, 402*b* may include a light 404, 404*b* and a laptop computing device 404, 404*c*. The kitchen 402, 402*c* may include a refrigerator 404, 404*d* and a microwave 404, 404*e*; the living room 402, 402d may include a living room smart television 404, 404f and an automated speaker 404, 404g. The home 400 may have any combination of household devices and/or rooms including other rooms and household devices not explicitly described above and depicted in FIG. 1.

As described in more detail below, the user device 200 can access the network 120 to request authorization to access the household devices 404. When the user device 200 is provided with authorization, the user device 200 can access the household devices directly or through the remote system 110.

User Device

Figure 2:
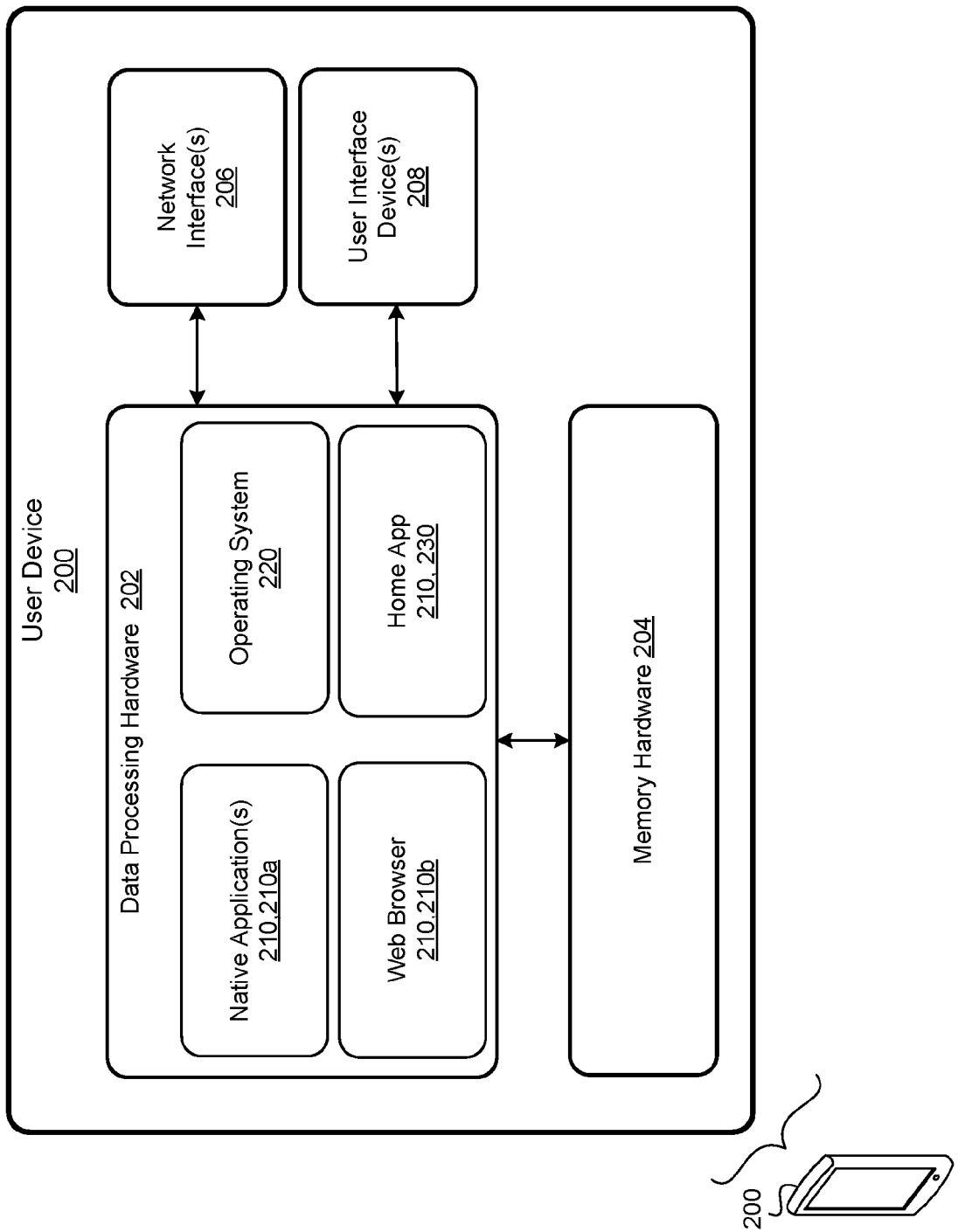
FIG. 2 is a schematic view of an example user device.

FIG. 2 shows an example user device 200. The user device 200 can be any computing device capable of providing requests 250 to the home system 300. User devices 200 include, but are not limited to, mobile computing devices, such as laptops, tablets, smart phones, and wearable computing devices (e.g., headsets and/or watches). User devices 200 may also include other computing devices having other form factors, such as computing devices included in desktop computers, vehicles, gaming devices, televisions, or other appliances (e.g., networked home automation devices and home appliances).

In the example shown, the user device 200 includes data processing hardware 202 in communication with memory hardware 204, a network interface 206, and a user interface 208, such as a screen. The user device 200 may include other components not explicitly depicted. In implementations where the data processing hardware 202 includes two or more processors, the processors can execute in a distributed or individual manner. The memory hardware 204 (e.g., random access memory (RAM), read-only memory (ROM), hard disk drive and/or flash memory) stores instructions that when executed on the data processing hardware 202 cause the data processing hardware 202 to perform one or more operations. The memory hardware 204 may store computer readable instructions for a software application 210, such as a native application 210a, a web browser 210b, and/or the operating system 220. The operating system 220 acts as an interface between the data processing hardware 202 and the applications 210. The network interface 206 includes one or more devices configured to communicate with the network 120. The network interface 206 can include one or more transceivers for performing wired or wireless communication. Examples of the network interface 206 may include, but are not limited to, a transceiver configured to perform communications using the IEEE 802.11 wireless standard, an Ethernet port, a wireless transmitter, and a universal serial bus (USB) port. The user interface 208 includes one or more devices configured to receive input from and/or provide output to the user 10. The user interface 208 can include, but is not limited to, a touchscreen, a display, a QWERTY keyboard, a numeric keypad, a touchpad, a microphone, and/or speakers.

A software application 210 may refer to computer software that, when executed by a computing device, causes the computing device to perform a task. In some examples, a software application 210 is referred to as an "application", an "app", or a "program". Example software applications 210 include, but are not limited to, word processing applications, spreadsheet applications, messaging applications, media streaming applications, social networking applications, and games. In some examples, applications 210 are installed on the user device 200 prior to a user 10 purchasing the user device 200. In other examples, the user 10 may download and install applications 210 on the user device 200.

The user device 200 may use a variety of different operating systems 220. In examples where the user device 200 is a mobile device, the user device 200 may run an operating system including, but not limited to, ANDROID® developed by Google Inc., IOS® developed by Apple Inc., or WINDOWS PHONE® developed by Microsoft Corporation. Accordingly, the operating system 224 running on the user device 200 may include, but is not limited to, one of ANDROID®, IOS®, or WINDOWS PHONE®. In an example where a user device 200 is a laptop or desktop computing device, the user device 200 may run an operating system including, but not limited to, MICROSOFT WINDOWS® by Microsoft Corporation, MAC OS® by Apple, Inc., or Linux. User devices 200 may also access the home system 300 while running operating systems 220 other than those operating systems 220 described above, whether presently available or developed in the future.

Home System

Figure 3A:
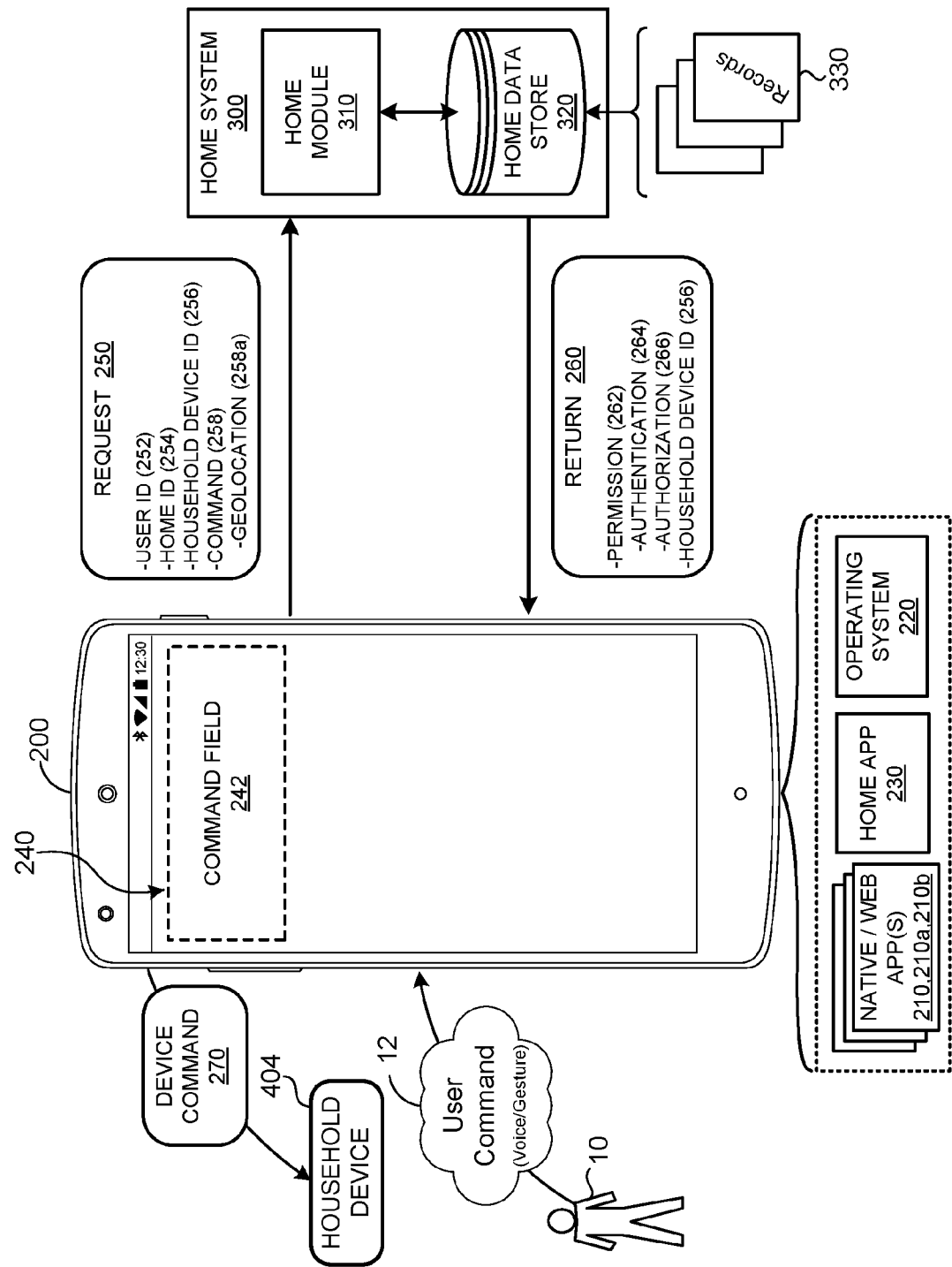
FIG. 3A is a schematic view of example interactions between an example user device and an example home system.

FIG. 3A shows an example user device 200 in communication with the home system 300. In general, the user device 200 may communicate with the home system 300 using any software application 210 that can transmit requests 250 to the home system 300 to access or command one or more household devices 404. In some examples, the user device 200 runs a native application 210a that is dedicated to interfacing with the home system 300, such as a home application 230. In additional examples, the user device 200 communicates with the home system 300 using a more general application 210, such as a web-browser application 210b accessed using a web browser. Although the user device 200 may communicate with the home system 300 using a native application 210a and/or a web-browser application 210b, the user device 200 may be described hereinafter as using the home application 230 to communicate with the home system 300.

In some implementations, the home system 300 includes a home module 310 in communication with a home data store 320. The home data store 320 may include one or more databases, indices (e.g., inverted indices), tables, files, or other data structures, which may be used to implement the techniques of the present disclosure. The home module 310 receives a request 250 and generates a return 260 based on the data included in the home data store 320. In some implementations, the home module 310 receives a request 250 from the user device 200 and performs a search for records 330 included in the home data store 320 based on data included in the request 250. The records 330 include access information that the user device 200 can use to access different functions and/or properties of a corresponding household device 404.

The home module 310 receives a request 250 from the user device 200 via the network 120. A request 250 may include a user identification (user ID) 252, a home identification (home ID) 254, a household device identification (household device ID) 256, and/or a command 258, each of which may include text, numbers, and/or symbols (e.g., punctuation) entered into the user device 200 by the user 10. For example, the user 10 may enter data corresponding to the command 258 into a command field 242 (e.g., a text box) of a graphical user interface (GUI) 240 of the home application 230 running on the user device 200. The user 10 may enter the data corresponding to the command 258 using a touchscreen keypad, a mechanical keypad, a speech-to-text program, or other forms of user input. In general, the command 258 may be a request for access to and manipulation of a requested household device 404 of the home system 300. For example, the command 258 may be directed to adjusting the light output intensity of the household device 404 in the instance where the household device 404 is a light.

Alternatively, the command 258 may include data that is interpreted by the user device 200 from a user command 12. In some examples, the user command 12 includes gestures, sounds and/or signs provided by the user 10. Accordingly, the command 258 may be determined without data manually entered into the command field 242 of the GUI 240 by the user 10.

The request 250 may include additional data along with the command 258. The user ID 252 and the home ID 254 may be populated in the request 250 based on data tied to the user device 200. For example, the user device 200 may require a username and password to enable features of the operating system 220. The username may be implemented as the user ID 252. As an alternative, the user ID 252 may be provided by the native application 210a, the web-browser application 210b, or the home application 230 based on a login to the respective applications.

The home ID 254 indicates an identity of the home 400 to the home system 300. The home ID 254 may be verified by location data provided in the request 250. For example, the request 250 may include geo-location data 258a that indicates the location of the user device 200, such as latitude and longitude coordinates. The user device 200 may include a global positioning system (GPS) receiver that generates the geo-location data 258a transmitted in the request 250. In addition or alternatively, the request 250 may include an IP address, which the home module 310 may use to determine the location of the user device 200. In some examples, the request 250 also includes additional data, including, but not limited to, platform data (e.g., version of the operating system 220, device type, and web-browser version), and other data.

The home module 310 uses the command 258 and the additional data included in the request 250 to process the request 250 and generate the return 260. The home module 310 authenticates the request 250 by accessing the home data store 320 and retrieving records included in the home data store 320. In some implementations, the home module 310 performs a search for records 330 included in the home data store 320 in response to the received request 250 (e.g., in response to the command 258). In some implementations, the home module 310 uses the household device ID 256 to find a corresponding record of the records 330. The corresponding record may also include the device location ID that identifies a device location (e.g. device room) of the household device 404.

The home module 310 analyzes at least one of the user ID 252, the home ID 254, the household device ID 256, the command 258, and the geolocation data 258a to determine permission 262. The permission 262 may include an authentication 264 of the user 10 and an authorization 266 of the user 10 to access and/or command the requested household device 404. In the example shown, the return 260 includes the permission 262 and a device ID 256. The permission 262 authorizes the user device 200 to communicate with the household device 404 identified by the household device ID 256. In the example shown, the user device 200 transmits a device command 270 to the household device 404 identified by the household device ID 256.

The permission 262 may be included in subsequent communications between the user device 200 and the household device 404. The household device ID 256 or similar identifier may accompany the permission 262 in the return 260. The household device ID 256 identifies the household device 404 corresponding to the permission 262.

Figure 3B:
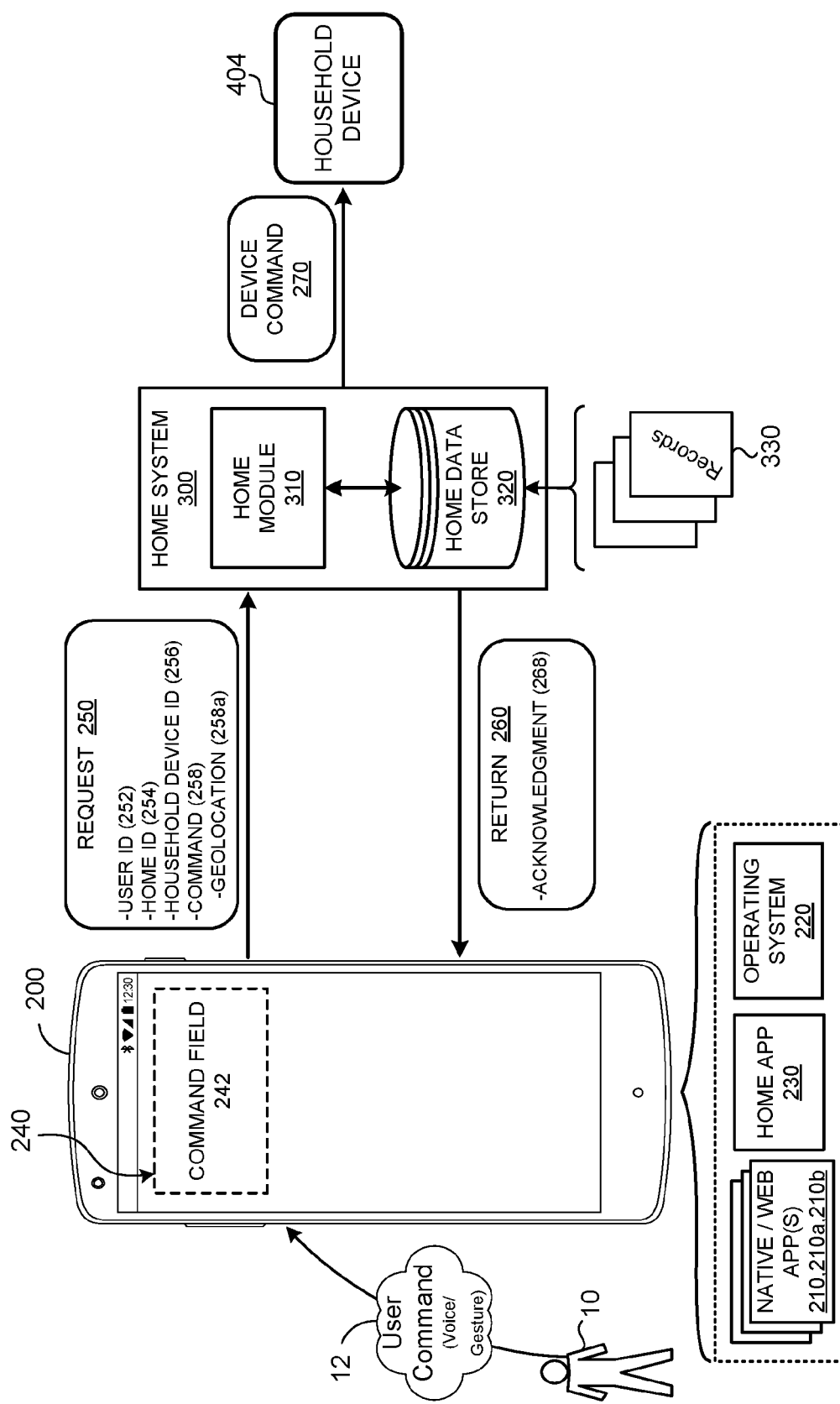
FIG. 3B is a schematic view of example interactions between an example user device and an example home system.

FIG. 3B is a schematic of a home system 300 communicating directly with an example household device 404 after authenticating a user device 200. As discussed earlier, the user device 200 may communicate with the home system 300 using any software application 210 that can transmit requests 250 to the home system 300. As with the example shown in FIG. 3A, the home module 310 receives a request 250 from the user device 200 via the network 120, and the request 250 may include a user identification (user ID) 252, a home identification (home ID) 254, a household device identification (household device ID) 256, and/or a command 258, each of which may include text, numbers, and/or symbols (e.g., punctuation) entered into the user device 200 by the user 10. Again, the command 258 may be a request for access to and manipulation of a requested household device 404 of the home system 300. For example, the command 258 may be directed to adjusting some operating property of the household device 404. Alternatively, the command 258 may include data that is interpreted by the user device 200 from a user command 12. For example, the user command 12 may include gestures, sounds and/or signs provided by the user 10. Accordingly, the command 258 may be determined without data manually entered into the command field 242 of the GUI 240 by the user 10.

As with the example of FIG. 3A, the request 250 may include additional data along with the command 258. The user ID 252 and the home ID 254 may be populated in the request 250 based on data tied to the user device 200. For example, the user device 200 may require a username and password to enable features of the operating system 220. The username may be implemented as the user ID 252. As an alternative, the user ID 252 may be provided by the native application 210a, the web-browser application 210b, or the home application 230 based on a login to the respective applications.

The home module 310 uses the command 258 and the additional data included in the request 250 to process the request 250 and generate the return 260. The home module 310 authenticates the request 250 by accessing the home data store 320 and retrieving records included in the home data store 320. In some implementations, the home module 310 performs a search for records 330 included in the home data store 320 in response to the received request 250 (e.g., in response to the command 258). In some implementations, the home module 310 uses the household device ID 256 to find a corresponding record of the records 330. The corresponding record 330 may also include the device location ID that identifies a device location (e.g. device room) of the household device 404.

The home module 310 analyzes at least one of the user ID 252, the home ID 254, the household device ID 256, the command 258 and the geolocation data 258a to authenticate the request 250. The home system may transmit a return 260 that includes an acknowledgement 268 upon authentication of the request 250. The home system authenticates the request 250 to enable the command 258 to be transmitted to the household device 404. In the example shown, the home system transmits the device command 270 to the household device 404 identified by the household device ID 256.

In the example shown, the return 260 acknowledges authentication of the request 250 by the home system 300. The return 260 further acknowledges transmission of the device command 270 by the home system 300.

Figure 3C:
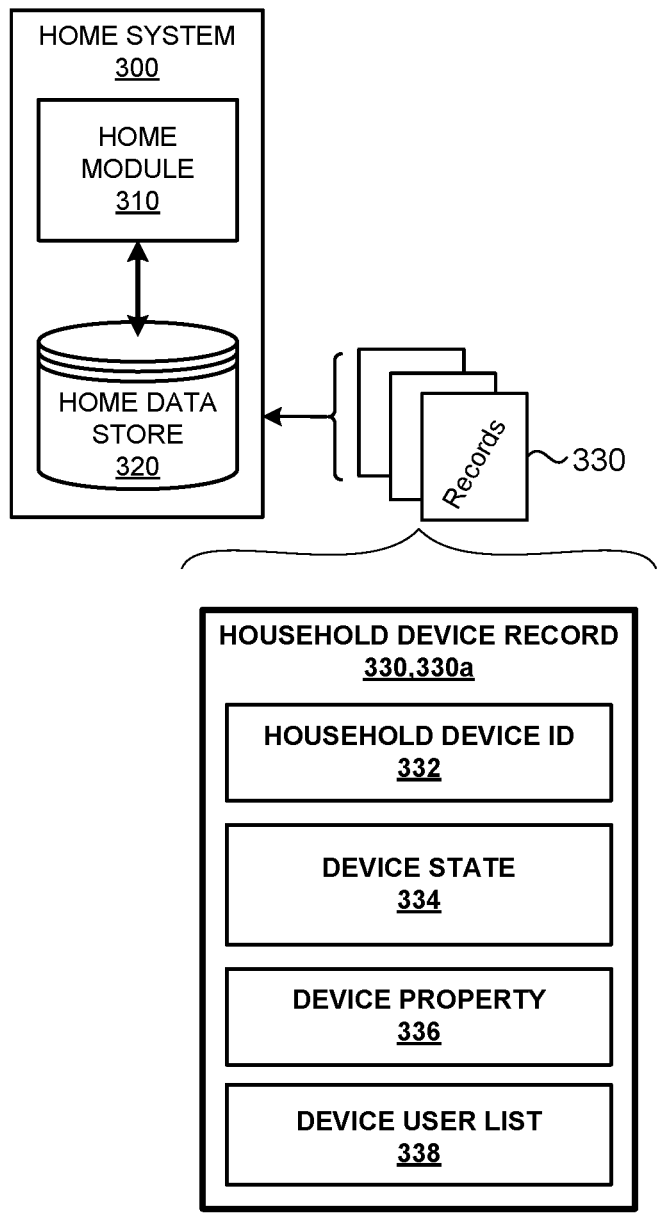
FIG. 3C is a schematic view of an example home system.

FIG. 3C depicts an example record 330 stored in the home data store 320. As shown, the home module 310 may access the home data store 320, which stores records 330. An example household device record 330, 330a may include informational data including a household device ID 332, a device state 334, a device property 336 and a device user list 338. The household device ID 332 is a unique identifier, such as a media access control (MAC) address that identifies the household device on the network. The device state 334 may be a device status, such as whether a device is in an on state or an off state. The device property 336 may be a user-adjustable characteristic of the household device, such as a lighting intensity for a light device or a temperature setting for a thermostat. The device user list 338 includes a list of user IDs 252 that are authorized to access a household device 404 corresponding to the household device ID 332.

Figure 4A:
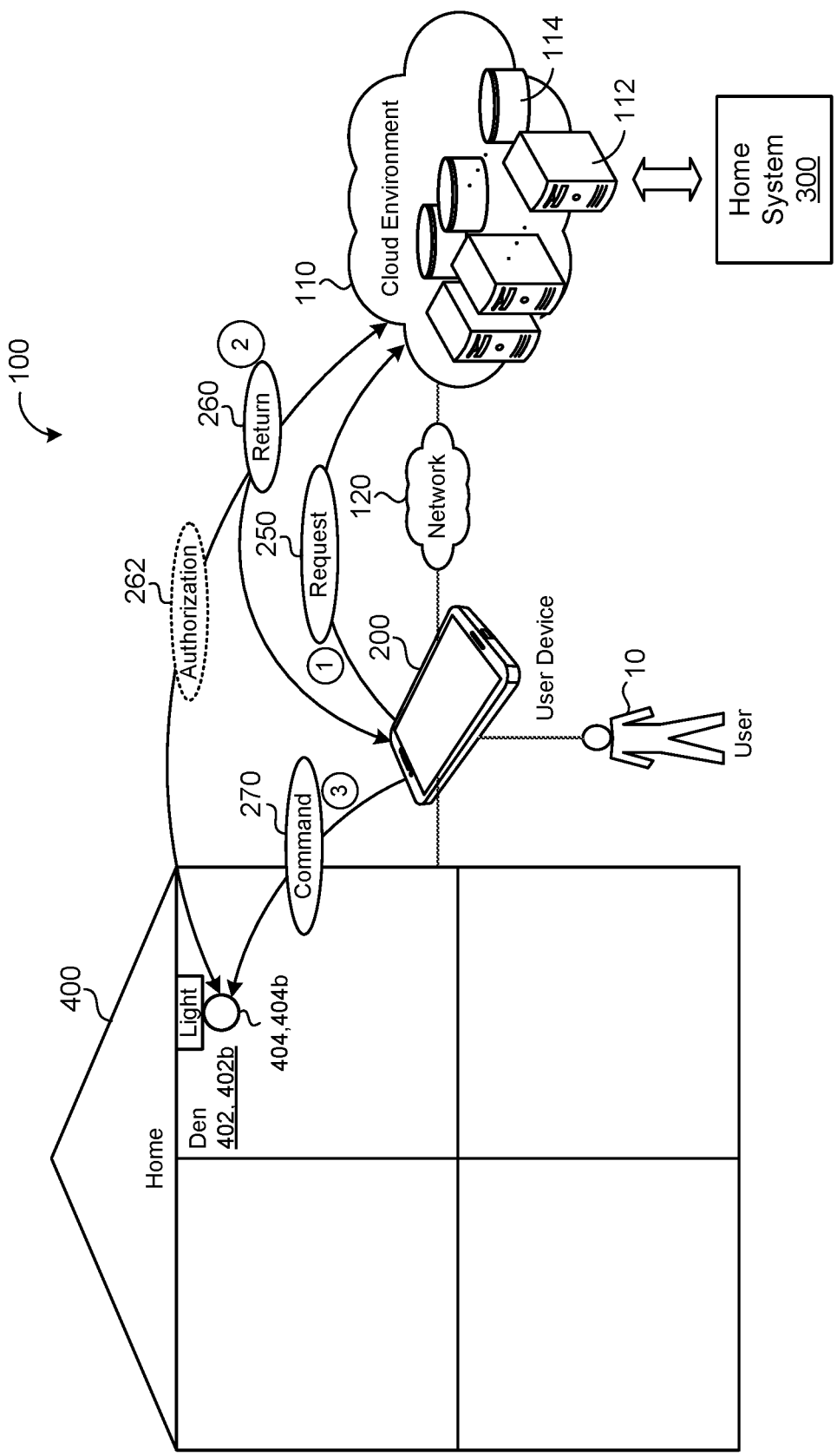
FIG. 4A is a schematic view of example communications between an example user device, an example household device, and an example home system.

FIG. 4A is a schematic view that illustrates an example flow of communication between a light 404, 404b, the user device 200, and the home system 300. Household devices 404 are not limited to the light 404, 404b of the den 402, 402b, as other types of household devices 404 are possible as well. In the example shown, device commands 270 are sent by the user device 200 to household device 404, in this case, the light 404b, after authorization by the home system 300.

In the example shown, at (1), the user 10 interfaces with the user device 200 to cause the user device 200 to generate and transmit a request 250 to the remote system 110 via the network 120. The home system 300 analyzes the request 250 to determine a permission 262 of the user 10. When the home system 300 determines that the user 10 is authenticated and authorized to interact with the household device 404, e.g., the light 404b, through the user device 200, the home system 300, at (2), grants/issues the permission 262 via a return 260 from the remote system 110 to the user device 200 and/or the household device 404 through the network 120. The permission 262 authenticates and authorizes the user device 200 to communicate directly with the light 404, 404b. In some examples, the user device 200 receives an authorization 264 from the return 260 sent by the home system 300. Additionally or alternatively, the household device 404 receives the authorization 264 from the home system 300. At (3), the user device 200 sends a command 270 to the household device 404. The command 270 may include the authorization 264 to access and command the household device 404.

Figure 4B:
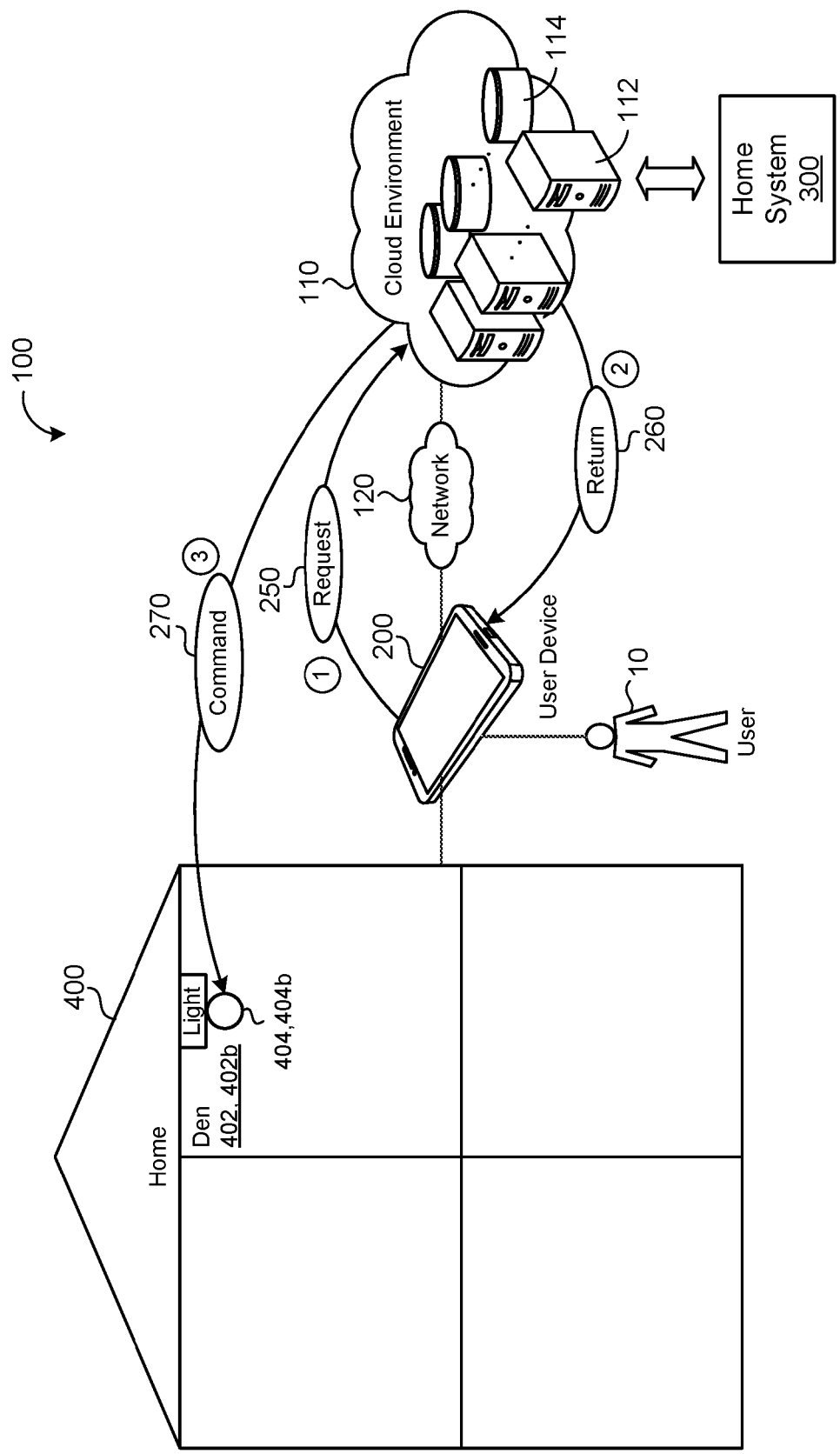
FIG. 4B is a schematic view of example communications between an example user device, an example household device, and an example home system.

FIG. 4B is a schematic view of an example flow of communication using the remote system 110 to communicate directly with the light 404, 404b. In the example shown, at (1), the user 10 interfaces with the user device 200 to cause the user device 200 to generate and transmit a request 250 to the remote system 110 via the network 120. The home system 300 analyzes the request 250 to determine a permission 262 of the user 10. When the home system 300 determines that the user 10 is authenticated and authorized to interact with the household device 404, e.g., the light 404b, through the user device 200, the home system 300, at (2), sends a return 260 to the user device 200 acknowledging an authentication 264 and authorization 266 of the user 10 to command the household device 404. Moreover, at (3), the home system 300 sends a command 270 to the household device 404 to command/operate the household device 404 according to the request 250. The household device 404 (i.e., the light 404b) processes the received command 270 and operates accordingly.

Figure 5A:
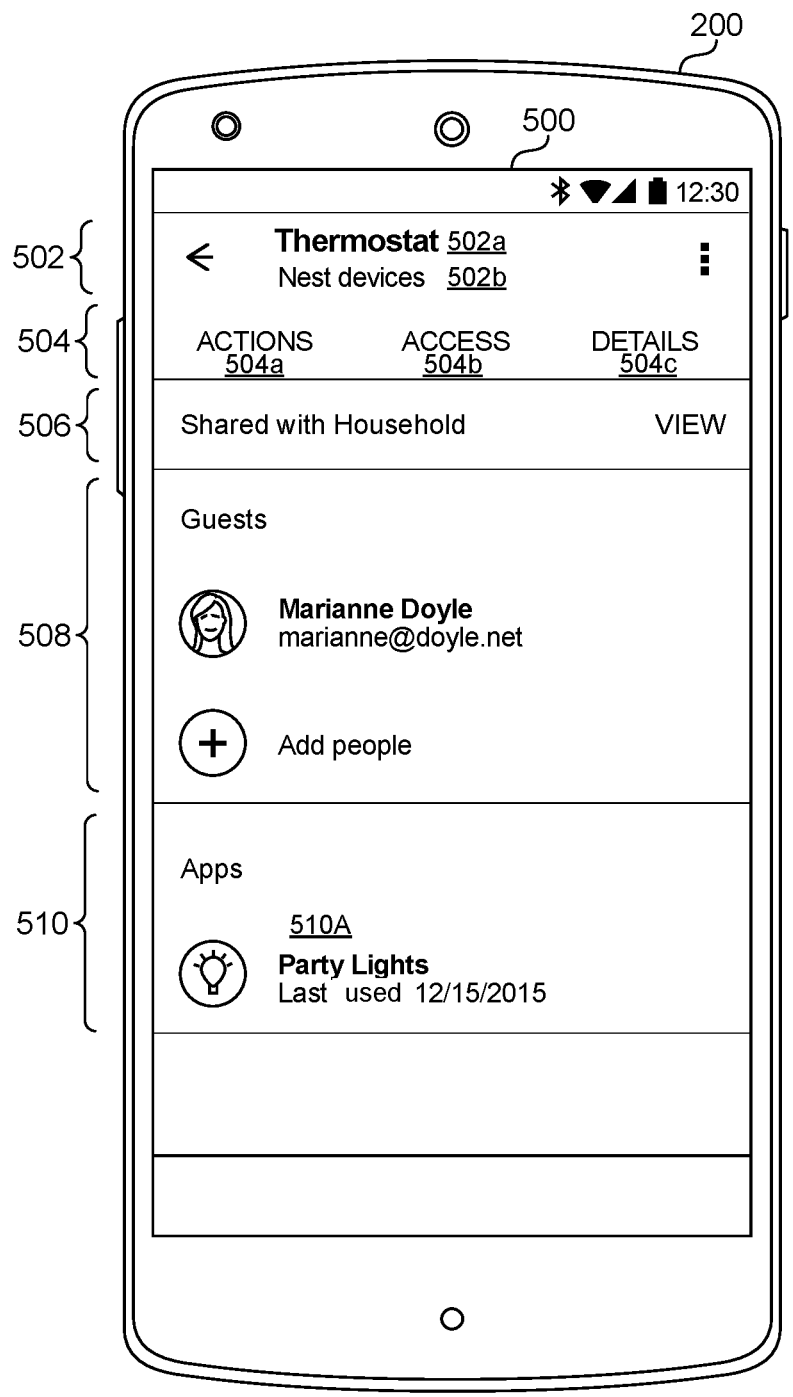
FIG. 5A is a schematic view of an example user device with an example interface of an example household device.

FIG. 5A illustrates an example of display properties of an interface 500 of the user device 200 in more detail. The interface 500 of the user device 200 includes a title bar 502. For example, the title bar 502 displays a name 502a of a household device 404 and a group 502b of the household device 404. An informational detail bar 504 may provide indicia that a user can select by interacting with the interface 500. For example, the informational detail bar 504 provides actions indicia 504a, access indicia 504b, and details indicia 504c that may be selected by the user 10. The actions indicia 504a can enable display of available actions the user 10 can take with the household device 404 displayed in the title bar 502. The access indicia 504b can enable a display of available users 10 and their respective access levels to the household device 404. The details indicia 504c can provide additional details about the household device 404, including a current household device status. A sharing status bar 506 of the user device 200 can provide a list of household members that have access to the household device 404. A guest bar 508 provides a list of guests in the household that have temporary access to a set of features of the household device 404.

In addition, the user interface 500 can display one or more applications associated with a household device 404. In the implementation shown in FIG. 5A, an application bar 510 is shown. The application bar 510 provides access to one or more applications. In the implementation shown, the application bar 510 is shown that allows interaction with a party lights application 510a. The party lights application 510a allows the user 10 to control party lights as displayed on the user device 200.

Figure 5B:
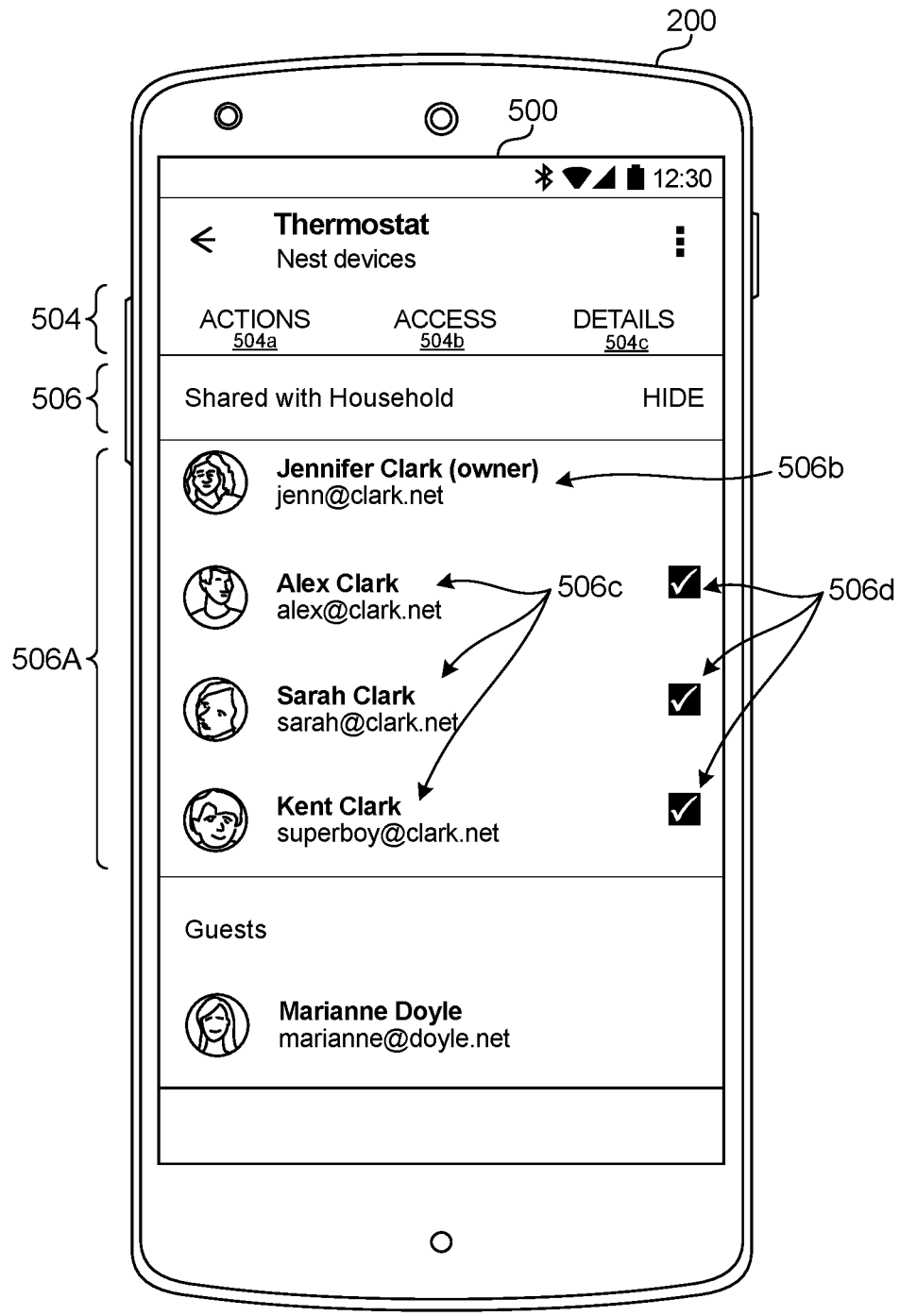
FIG. 5B is a schematic view of an example user device with an example user list display including selected users.

FIG. 5B illustrates an example interface 500 of the user device 200 that includes an expanded view of the sharing status bar 506. In this implementation, when the user 10 selects the sharing status bar 506, an expanded list 506a appears that includes an owner 506b and available users 506c. Selection indicia 506d are located next to available users 506c. The user 10 may select a corresponding selection indicator of selection indicia 506d to selectively add and remove available users 506c from being able to access the household device indicated by the title bar 502.

Figure 5C:
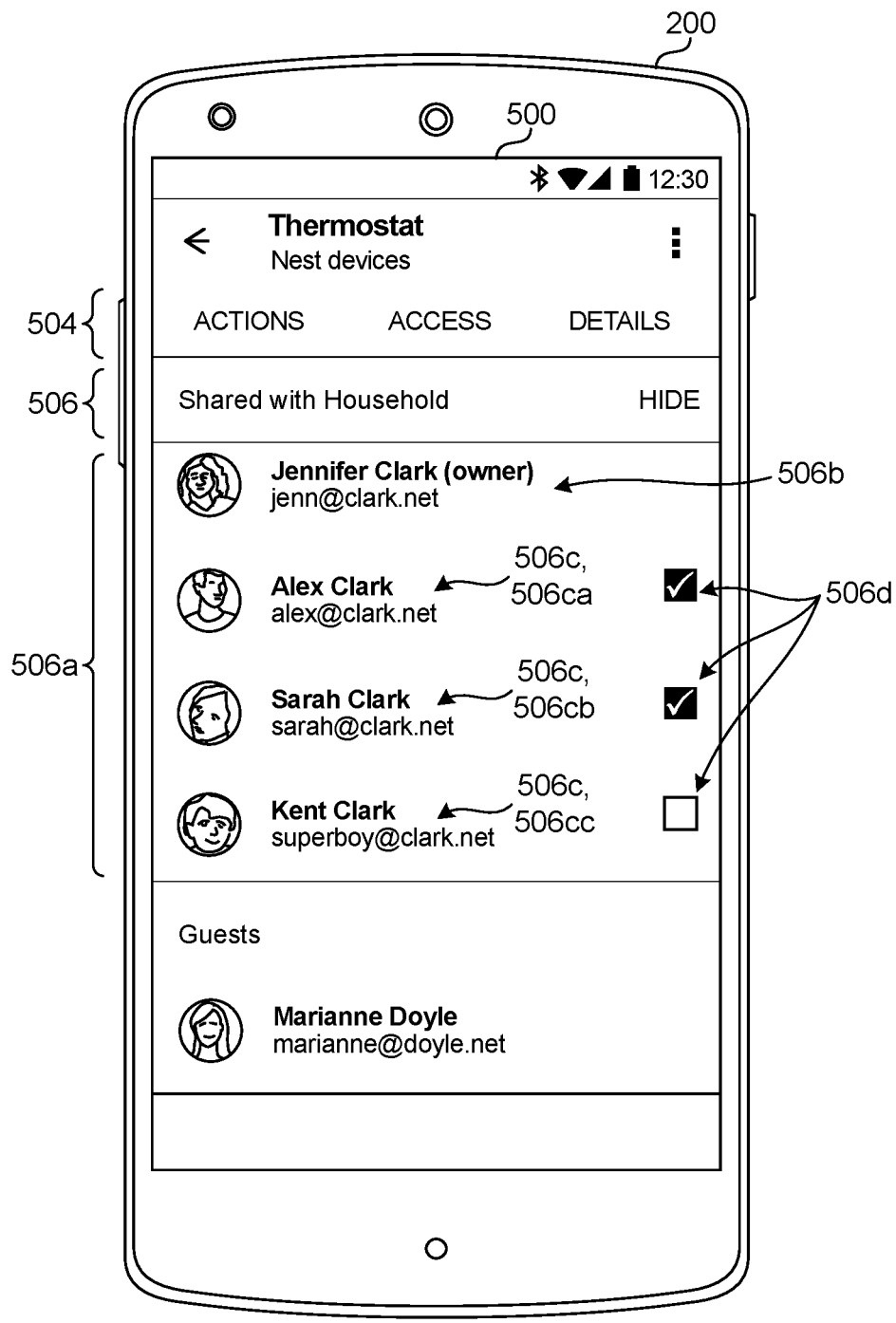
FIG. 5C is a schematic view of an example user device with an example user list display including partially selected users.

FIG. 5C illustrates an example interface 500 of an example user device 200 that includes an expanded view of the sharing status bar 506 with selective enabling and disabling of available users. As shown, the user 10 may deselect available users 506c from the expanded list 506a. The user 10 may enable and disable a corresponding selection indicator of the selection indicia 506d to control access to the household device 404 identified in title bar 502. In the implementation shown, first and second available users 506ca, 506cb are selected as having access to the household device 404 identified by the title bar 502, where a third available user 506cc is deselected from having access to the household device 404.

Figure 6:
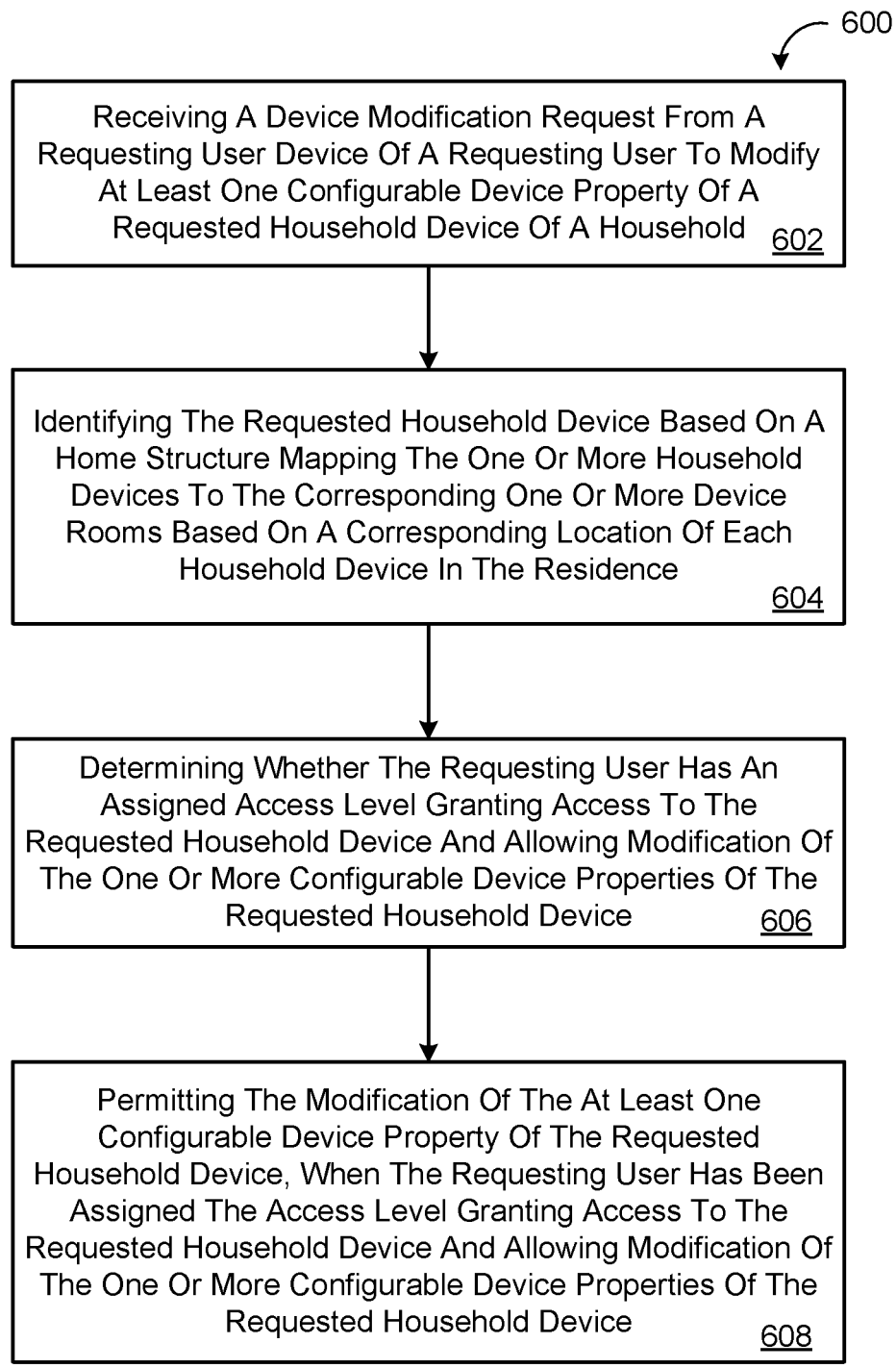
FIG. 6 is a flowchart providing an example arrangement of operations for a method of administering access to a user device.

FIG. 6 illustrates a method 600 of communication via a home system 300 with a home 400 having household devices 404, as described with respect to FIGS. 2A-5C. At block 602, the method 600 includes receiving a request 250 from a requesting user device 200 of a requesting user 10 to modify at least one configurable device property of a requested household device 404b of a household. At block 604, the method 600 includes identifying the requested household device 404b based on a home structure mapping the one or more household devices 404 to the corresponding one or more device rooms 402 based on a corresponding location of each household device 404 in the home 400. At block 606, the method 600 includes determining whether the requesting user 10 has an assigned access level granting access to the requested household device 404b and allowing modification of the one or more configurable device properties of the requested household device 404b. At block 608, the method 600 includes permitting the modification of the at least one configurable device property of the requested household device 404b, when the requesting user 10 has been assigned the access level granting access to the requested household device 404b and allowing modification of the one or more configurable device properties of the requested household device 404b.

Figure 7:
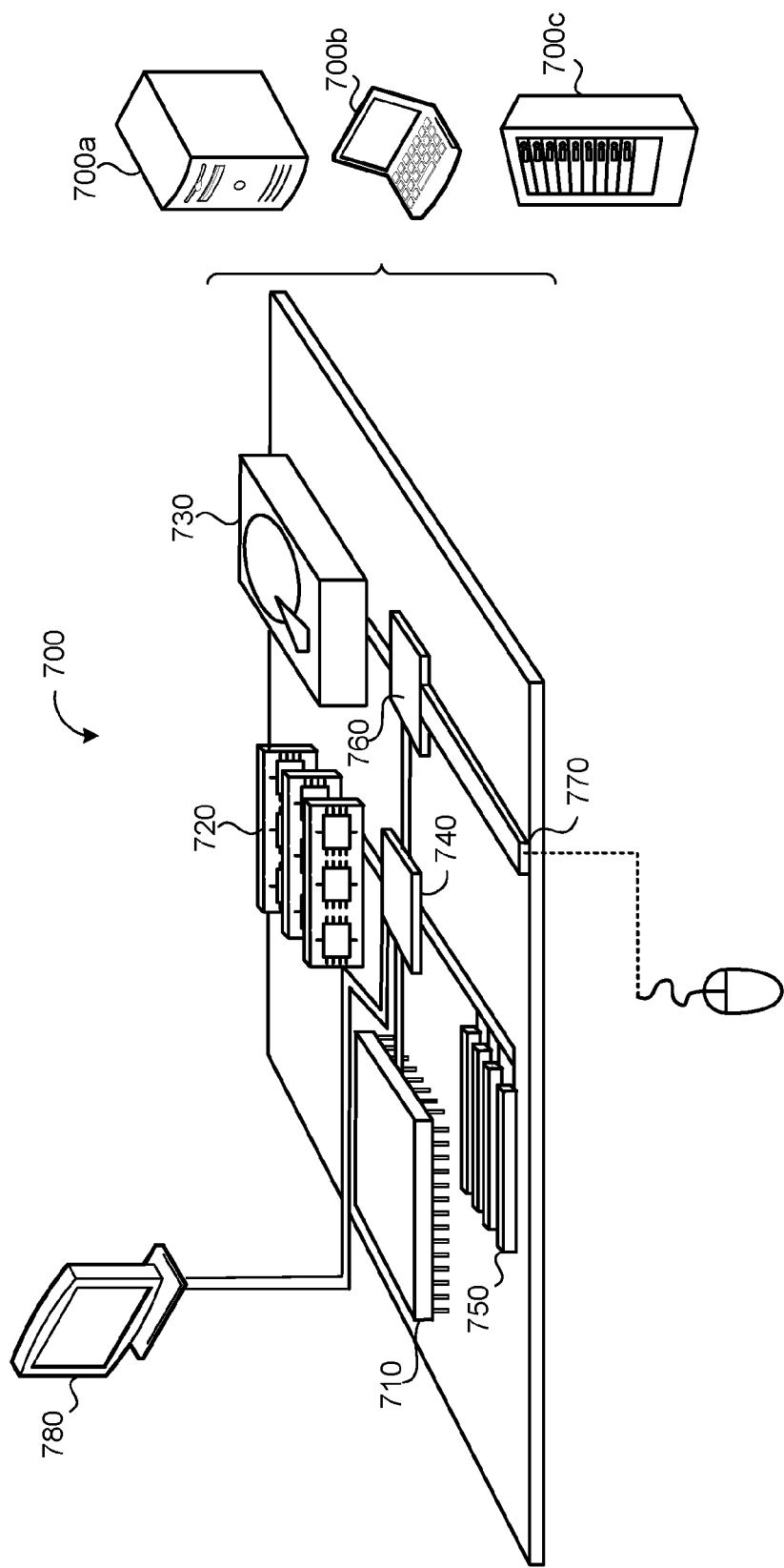
FIG. 7 is schematic view of an example computing device that may be used to implement the systems and methods described herein.

FIG. 7 is a schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to low speed bus 770 and storage device 730. Each of the components 710, 720, 730, 740, 770, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and low-speed expansion port 770. The low-speed expansion port 770, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
    receiving, at data processing hardware of a distributed system, a device modification request through an external network from a requesting user device of a requesting user to modify at least one configurable device property of a requested household device of a household, the device modification request including location data of the requesting user device, a household device identifier identifying the requested household device, and a household identifier identifying the household, wherein
        the requesting user is one of one or more users associated with the household,
        the household is associated with a residence having one or more device rooms, each device room having at least one household device in communication with a communication network of the residence, each household device having one or more configurable device properties, and
        each user is associated with a corresponding user device configured to communicate with the communication network of the residence and the data processing hardware of the distributed system through the external network;
    retrieving, by the data processing hardware, a corresponding household device record associated with the requested household device from memory hardware of the distributed system using the household device identifier, the household device record including:
        a corresponding household device location identifier that identifies the corresponding device room of the requested household device within the residence; and
        a user group for the requested household device, the user group indicating at least one user having an assigned access level granting access to the requested household device and allowing modification of the at least one configurable device property of the requested household device:
    verifying, by the data processing hardware, the household identifier based on the location data of the user device;
    when the user group for the requested household device includes the requesting user, determining, by the data processing hardware, whether the assigned access level of the requesting user grants access to the requested household device and allows modification of the at least one configurable device property of the requested household device; and
    when the requesting user has been assigned the access level allowing modification of the at least one configurable device property of the requested household device, permitting, by the data processing hardware, the modification of the at least one configurable device property of the requested household device.

2. The method of claim 1, further comprising transmitting a connection authorization command from the data processing hardware to the requested household device, the connection authorization command permitting the requesting user device of the requesting user to connect to the requested household device through the communication network and modify the at least one configurable device property of the requested household device.

3. The method of claim 1, further comprising transmitting a device command through the external network from the data processing hardware to the requested household device to modify the at least one configurable device property.

4. The method of claim 1, further comprising receiving, at the data processing hardware, a gesture command or a voice command from the requesting user device, the gesture command or the voice command comprising the device modification request.

5. The method of claim 1, further comprising, for each user:
    assigning, by the data processing hardware, a corresponding access level for each household device, the access level identifying:
        whether the user can access, by the corresponding user device, the household device though the communication network; and
        whether the user can modify, by the corresponding user device, at least one configurable device property of the household device.

6. The method of claim 1, further comprising assigning at least one user of the one or more users associated with the household as an administrator that determines the user group.

7. The method of claim 1, further comprising assigning two or more of the household devices different administrators and assigning each administrator access to all of the one or more configurable device properties of the corresponding household device, each administrator being one of the one or more users.

8. The method of claim 1, further comprising transmitting a command from the user device to the requested household device to modify the at least one configurable device property.

9. The method of claim 1, further comprising displaying on a screen in communication with the data processing hardware the one or more users associated with the household.

10. The method of claim 9, further comprising accessing a software application to control the household device by communicating with the screen.

11. A system comprising:
  data processing hardware of a distributed system; and
  memory hardware of the distributed system in communication with the data processing hardware, the memory hardware storing instructions that when executed on the data processing hardware cause the data processing hardware to perform operations comprising:
    receiving a device modification request through an external network from a requesting user device of a requesting user to modify at least one configurable device property of a requested household device of a household, the device modification request including location data of the requesting user device, a household device identifier identifying the requested household device, and a household identifier identifying the household, wherein
      the requesting user is one of one or more users associated with the household,
      the household is associated with a residence having one or more device rooms, each device room having at least one household device in communication with a communication network of the residence, each household device having one or more configurable device properties, and
      each user is associated with a corresponding user device configured to communicate with the communication network of the residence and the data processing hardware of the distributed system through the external network;
    retrieving a corresponding household device record associated with the requested household device from the memory hardware using the household device identifier, the household device record including:
      a corresponding household device location identifier that identifies the corresponding device room of the requested household device within the residence; and
      a user group for the requested household device, the user group indicating at least one user having an assigned access level granting access to the requested household device and allowing modification of the at least one configurable device property of the requested household device:
    verifying the household identifier based on the location data of the user device;
    when the user group for the requested household device includes the requesting user, determining whether the assigned access level of the requesting user grants access to the requested household device and allows modification of the at least one configurable device property of the requested household device; and
    when the requesting user has been assigned the access level allowing modification of the at least one configurable device property of the requested household device, permitting the modification of the at least one configurable device property of the requested household device.

12. The system of claim 11, wherein the operations further comprise transmitting a connection authorization command from the data processing hardware to the requested household device, the connection authorization command permitting the requesting user device of the requesting user to connect to the requested household device through the communication network and modify the at least one configurable device property of the requested household device.

13. The system of claim 11, wherein the operations further comprise transmitting a command through the external network from the data processing hardware to the requested household device to modify the at least one configurable device property.

14. The system of claim 11, wherein the operations further comprise receiving a gesture command or a voice command from the requesting user device, the gesture command or the voice command comprising the device modification request.

15. The system of claim 11, wherein the operations further comprise, for each user:
  assigning a corresponding access level for each household device, the access level identifying:
    whether the user can access, by the corresponding user device, the household device though the communication network; and
    whether the user can modify, by the corresponding user device, at least one configurable device property of the household device.

16. The system of claim 11, wherein at least one user of the one or more users associated with the household is an administrator that determines the user group.

17. The system of claim 11, wherein two or more of the household devices have different administrators, each administrator having access to all of the one or more configurable device properties of the corresponding household device, each administrator being one of the one or more users.

18. The system of claim 11, wherein at least one user is associated with multiple households.

19. The system of claim 11, wherein the operations further comprise displaying on a screen in communication with the data processing hardware the one or more users associated with the household.

* * * * *